(12) United States Patent
Browne et al.

(10) Patent No.: US 8,687,340 B2
(45) Date of Patent: Apr. 1, 2014

(54) ACTUATION AND PROTECTION UTILIZING ACTIVE MATERIAL ACTIVATION DURING LIGHTNING STRIKES AND SIMILAR EVENTS

(75) Inventors: Alan L. Browne, Grosse Pointe, MI (US); Nancy L. Johnson, Northville, MI (US); Nicholas W Pinto, IV, Ferndale, MI (US); Mohan Sundar, Troy, MI (US); Paul W. Alexander, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 706 days.

(21) Appl. No.: 12/940,603

(22) Filed: Nov. 5, 2010

(65) Prior Publication Data

US 2012/0113558 A1     May 10, 2012

(51) Int. Cl.
*H02H 1/04*     (2006.01)

(52) U.S. Cl.
USPC .......................................................... 361/117

(58) Field of Classification Search
USPC .......................................................... 361/117
See application file for complete search history.

(56) References Cited

U.S. PATENT DOCUMENTS

| | | | | |
|---|---|---|---|---|
| 4,702,094 A | * | 10/1987 | Peterson | 70/241 |
| 7,331,616 B2 | * | 2/2008 | Brei et al. | 292/100 |
| 7,392,876 B2 | * | 7/2008 | Browne et al. | 180/274 |
| 7,505,241 B2 | * | 3/2009 | McLoughlin et al. | 361/124 |
| 7,731,235 B2 | * | 6/2010 | Klukowski | 280/777 |
| 8,035,947 B2 | * | 10/2011 | Hoopes | 361/124 |
| 8,072,302 B2 | * | 12/2011 | Liang et al. | 335/229 |
| 8,109,087 B2 | * | 2/2012 | Usoro et al. | 60/528 |
| 8,319,596 B2 | * | 11/2012 | Pinto et al. | 337/139 |
| 2007/0285865 A1 | * | 12/2007 | McLoughlin et al. | 361/118 |
| 2009/0323244 A1 | * | 12/2009 | Hoopes | 361/103 |
| 2012/0113558 A1 | * | 5/2012 | Browne et al. | 361/117 |
| 2012/0293042 A1 | * | 11/2012 | Suzuki | 310/321 |

FOREIGN PATENT DOCUMENTS

| | | | | |
|---|---|---|---|---|
| JP | 02291631 | A | * | 12/1990 |
| JP | 04112426 | A | * | 4/1992 |
| JP | 08222409 | A | * | 8/1996 |

* cited by examiner

*Primary Examiner* — Ronald W Leja

(57) ABSTRACT

A method of and actuator/device for passively actuating or protecting a system, body or circuit during a lightning strike or other high voltage/current generation event, utilizing an active material element activated by the spike in current or voltage potential, and preferably a barrier connected in series to the element and configured to be overcome by the voltage/current event, so that the element is activated only during the event.

17 Claims, 2 Drawing Sheets

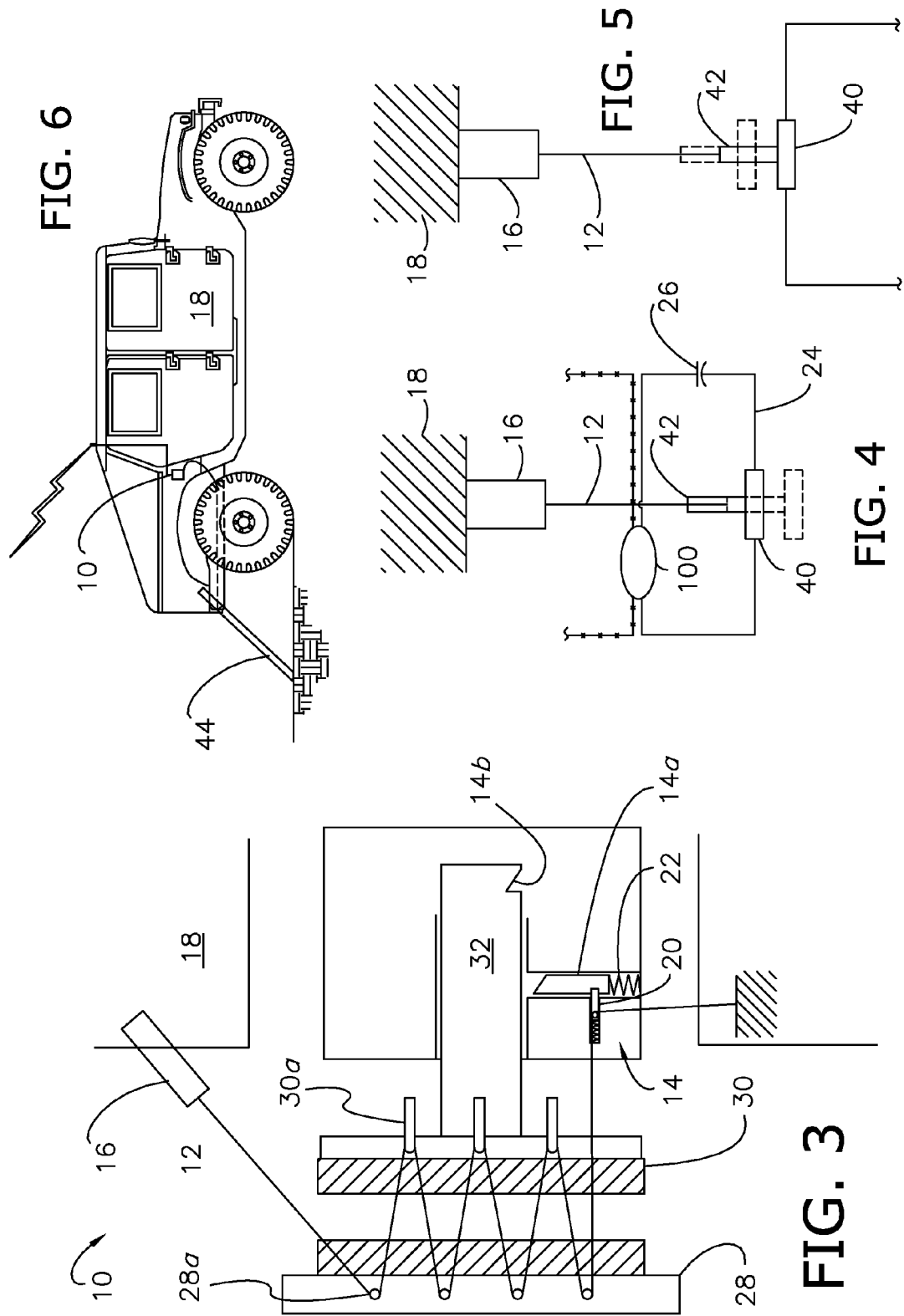

ACTUATION AND PROTECTION UTILIZING ACTIVE MATERIAL ACTIVATION DURING LIGHTNING STRIKES AND SIMILAR EVENTS

BACKGROUND OF THE INVENTION

1. Field of the Invention

The present disclosure generally relates to methods of protecting a circuit or effecting actuation of an electro-mechanical device during a lighting strike or similar event; and more particularly, to an active material actuator configured to utilize the voltage/current generated by a lightning strike to effect actuation and/or protection.

2. Discussion of Prior Art

Where exposed to a lightning strike or similar event, it has long been appreciated that electric circuits and the nodes fed thereby, may become damaged and/or inoperable. In a vehicular setting, for example, lightning strikes have the potential to damage the bus/electronics that serve the electro-mechanical components of the vehicle, including brake-by-wire, steer-by-wire, and/or door lock systems. Conventional measures, such as lightning rods, have been developed to dissipate the sudden increase in charge/current experienced during lightning strikes against structures. However, in other applications, such as the afore-mentioned vehicular setting, these measures are untenable, due to, for example, packaging and cost concerns.

BRIEF SUMMARY OF THE INVENTION

The present invention provides a novel means for effecting actuation of an electro-mechanical device and/or protection of an electric circuit that addresses these concerns. The passive operation offered and minimal packaging space required makes the inventive method/apparatus available for use in a wide variety of applications. The inventive method includes activating an active material element using the current and/or voltage potential generated by a lightning strike or similar event to effect the actuation or protection; and as such, provides the benefits associated with active material usage, including improved efficiency, and reduced repair/construction costs, number of moving parts, and noise (both acoustically and with respect to EMF) during operation, when compared to conventional drive mechanisms, which themselves might be harmed by the lightning strike or similar events such as contact with a downed high voltage power line.

In general, the invention concerns an active material actuator adapted for use with a system, body or circuit presenting a first condition. The actuator is configured to be passively activated during a sudden large voltage/current generation event, and comprises a conductive medium, and an active material element drivenly coupled to the system, body or circuit. The element is operable to undergo a reversible change in fundamental property when exposed to or occluded from an activation signal generated by the event. A barrier is connected in series to the element and medium, and configured to be overcome only by the voltage/current event. Finally, the actuator is configured to modify the system, body, or circuit as a result of the change, and may be used as a fuse or as an actuator.

The disclosure may be understood more readily by reference to the following detailed description of the various features of the disclosure and the examples included therein.

BRIEF DESCRIPTION OF THE SEVERAL VIEWS OF THE DRAWING

A preferred embodiment(s) of the invention is described in detail below with reference to the attached drawing figures of exemplary scale, wherein:

FIG. 3 is a partial cross-section of a braking system including first and second selectively engageable pads, a shape memory wire wrapping engaging the pads, a barrier connected in series to the wire, and a holding mechanism including a spring-biased latch, in accordance with a preferred embodiment of the invention;

FIG. 4 is a schematic plan of a system or circuit selectively coupled to an ultra-capacitor by an actuator comprising an active material element and barrier connected in series thereto, wherein the primary circuit (shown in "-X-" line type) having been fried by a lightning strike or similar event, in accordance with a preferred embodiment of the invention;

FIG. 5 is a schematic plan of a circuit selectively opened by an actuator comprising an active material element and barrier connected in series thereto, in accordance with a preferred embodiment of the invention; and FIG. 6 is an elevation of a vehicle comprising an actuator drivenly coupled to a conductive rod and selectively configured to ground the vehicle during a lightning strike or similar event.

DETAILED DESCRIPTION OF THE INVENTION

Figure 2:
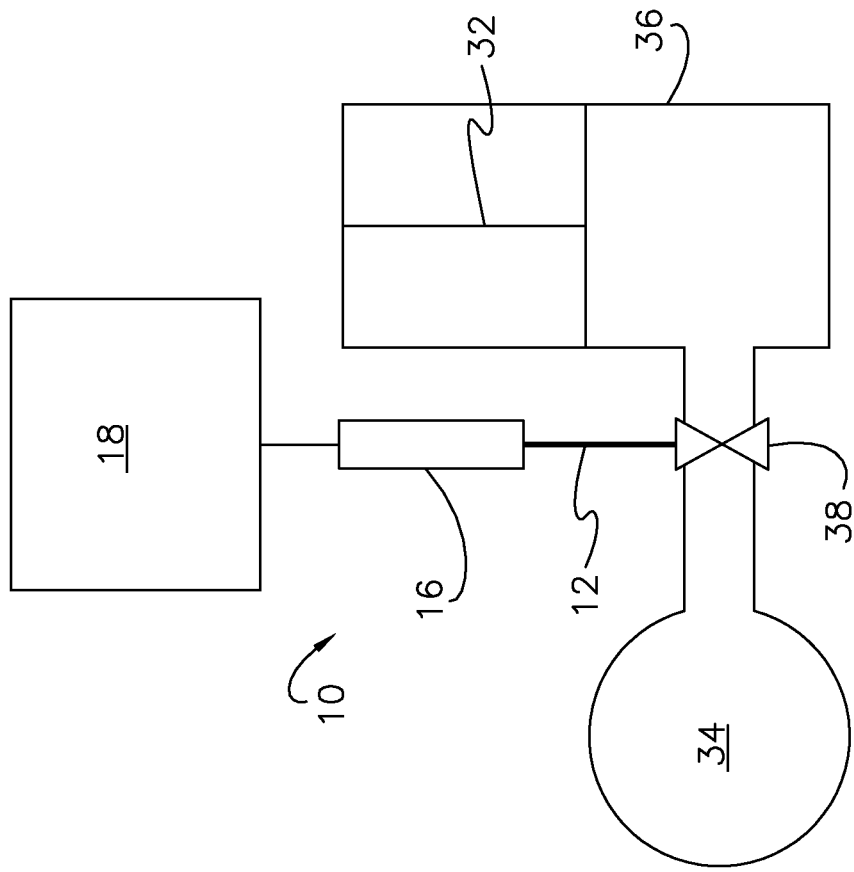
FIG. 2 is a schematic view of fluid reservoir of pressurized fluid fluidly coupled to an orifice, and an active material actuator operable to selectively open or close the orifice when activated, in accordance with a preferred embodiment of the invention.

The following description of the preferred embodiments is merely exemplary in nature and is in no way intended to limit the invention, its application, or uses. With reference to FIGS. 1-6, the present invention concerns an active material actuator 10 configured to be selectively activated by a sudden large voltage/current generation event, such as a lightning strike, vehicle contact with a downed live powerline, shorting battery, or similar spiking event. That is to say, the invention presents an alternative path that is only activated by said event. As alternatively presented by the plural embodiments, herein, activating the active material is used to protect a circuit, mechanically actuate a system or otherwise displace a body, and provide a passive means for grounding a structure. For example, the invention may be used to maintain the functionality of critical systems during lighting strikes, such as by-wire systems in vehicular and aerospace applications.

As such, the employed active material is of the type activated by an electric current, voltage potential, or a magnetic field/thermal signal generated thereby, as more specifically described below.

I. Active Material Discussion and Functionality

As used herein the term "active material" shall be afforded its ordinary meaning as understood by those of ordinary skill in the art, and includes any material or composite that exhibits a reversible change in a fundamental (e.g., chemical or intrinsic physical) property, when exposed to or occluded from an activation signal. Suitable active materials for use with the present invention include but are not limited to shape memory materials (e.g., shape memory alloys, shape memory polymers, ferromagnetic shape memory alloys, and electroactive polymers (EAP), piezoelectric composites, etc.). It is appreciated that these types of active materials have the ability to rapidly displace, or remember their original shape and/or elastic modulus, which can subsequently be recalled by applying an external stimulus. As such, deformation from the original shape is typically a temporary condition; however, in this invention it is appreciated that the material may be vaporized after actuation by the lightning strike event.

More particularly, SMA's generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. The term "yield strength" refers to the stress at which a material exhibits a specified deviation from proportionality of stress and strain. Generally, in the low temperature, or martensite (diffusionless) phase, shape memory alloys exists in a low symmetry monoclinic B19' structure with twelve energetically equivalent lattice correspondence variants that can be pseudo-plastically deformed, and upon exposure to some higher temperature transforms to an austenite or parent phase, which has a B2 (cubic) crystal structure. Transformation returns the alloy element to its shape prior to the deformation.

Shape memory alloys exist in several different temperature-dependent phases. The most commonly utilized of these phases are the so-called Martensite and Austenite phases discussed above. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature ($A_s$). The temperature at which this phenomenon is complete is called the austenite finish temperature ($A_f$).

When the shape memory alloy is in the austenite phase and is cooled, it begins to change into the martensite phase, and the temperature at which this phenomenon starts is referred to as the martensite start temperature ($M_s$). The temperature at which austenite finishes transforming to martensite is called the martensite finish temperature ($M_f$). Generally, the shape memory alloys are softer and more easily deformable in their martensitic phase and are harder, stiffer, and/or more rigid in the austenitic phase. In view of the foregoing, a suitable activation signal for use with shape memory alloys is a thermal activation signal having a magnitude to cause transformations between the martensite and austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the martensite to austenite type transition, and the material will recover the original, annealed shape. Hence, one-way shape memory effects are only observed upon heating. Active materials comprising shape memory alloy compositions that exhibit one-way memory effects do not automatically reform, and will likely require an external mechanical force if it is judged that there is a need to reset the device.

Intrinsic and extrinsic two-way shape memory materials are characterized by a shape transition both upon heating from the martensite phase to the austenite phase, as well as an additional shape transition upon cooling from the austenite phase back to the martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a shape memory alloy composition that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the system with shape memory effects, superelastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

It is appreciated that SMA's exhibit a modulus increase of 2.5 times and a dimensional change (recovery of pseudo-plastic deformation induced when in the Martensitic phase) of up to 8% (depending on the amount of pre-strain) when heated above their Martensite to Austenite phase transition temperature. It is appreciated that thermally induced SMA phase changes are one-way so that a biasing force return mechanism (such as a spring) would be required to return the SMA to its starting configuration once the applied field is removed. Joule heating can be used to make the entire system electronically controllable.

Ferromagnetic SMA's (FSMA's) are a sub-class of SMAs. These materials behave like conventional SMA materials that have a stress or thermally induced phase transformation between martensite and austenite. Additionally FSMA's are ferromagnetic and have strong magnetocrystalline anisotropy, which permit an external magnetic field to influence the orientation/fraction of field aligned martensitic variants. When the magnetic field is removed, the material may exhibit complete two-way, partial two-way or one-way shape memory. For partial or one-way shape memory, an external stimulus, temperature, magnetic field or stress may permit the material to return to its starting state. Perfect two-way shape memory may be used for proportional control with continuous power supplied. One-way shape memory is most useful for rail filling applications. External magnetic fields are generally produced via soft-magnetic core electromagnets in automotive applications, though a pair of Helmholtz coils may also be used for fast response.

Electroactive polymers include those polymeric materials that exhibit piezoelectric, pyroelectric, or electrostrictive properties in response to electrical or mechanical fields. An example of an electrostrictive-grafted elastomer with a piezoelectric poly(vinylidene fluoride-trifluoro-ethylene) copolymer. This combination has the ability to produce a varied amount of ferroelectric-electrostrictive, molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

II. Exemplary Actuators, Methods of Use, and Applications

The actuator 10 is configured so as to only be activated during a lightning strike or similar event, and operable to manipulate (e.g., translate, rotate, etc.) a driven component of a system, body, or circuit 100 to a desired position, orientation, configuration, or shape, when activated. To that end, the actuator 10 is configured, relative to the intended function, to generate sufficient actuating force. It is appreciated that the gauge, cross-sectional area, length, and/or otherwise configuration of the element 12 necessary to effect the actuation force, based on the active material employed, is readily determinable by those of ordinary skill in the art, and as such, the selection criteria will not be described in detail herein. The active material element 12 may take any suitable geometric configuration, and where described singularly may include a plurality of like or dissimilar elements acting redundantly or cooperatively, for example, to provide differing responses relative to a differing event characteristic. As used herein, the term "wire" is not limited to a singular strand configuration, and further includes other geometric forms such as bundles, strips, braids, cables, weaves, rolls, etc.

In the illustrated embodiment, an SMA wire 12 in the normally martensitic state is configured so as to be thermally activated to effect actuation of a by-wire system 100 composing a moving vehicle by an event, such as a lightning strike, wherein the lightning strike has otherwise "fried" the vehicle electronics (FIGS. 1-6). For example, an SMA wire 12 may be disposed in series with a Metal Oxide Varister (MOV), surge protector, transient voltage suppressor, or other type of barrier 16 that fails short, when connected to ground, and is communicatively coupled to a conductive medium (e.g., the vehicle frame/chassis/structural panels, etc.) 18 exposable to the event. More preferably, the conductive medium 18 is positioned, oriented, and/or configured to be likely engaged by the event.

The barrier 16 is configured so as to only be overcome by such an event, and as such, lays dormant during the normal operation of the system 100. That is to say, the preferred actuator 10 is non-antagonistic to, and does not influence, or present a load upon the system, body, and/or circuit 100. Thus, the MOV 16 acts as a voltage barrier that must be overcome before actuation. Once the MOV 16 is overcome, the SMA wire 12 is caused to contract and perform the intended function, e.g., opening an accumulator valve (FIG. 2), moving a pin 20 to release mechanical energy stored for example in a spring 22 (FIG. 3), or closing a secondary circuit 24 to receive energy from an electrically isolated secondary power source 26. With respect to the latter, for example, the wire 12 may selectively interconnect the system 100 to an ultra-capacitor 26, thereby enabling the ultra-capacitor 26 (FIG. 4) to release its charge. Alternatively, it is appreciated that the barrier 16 may be omitted, where the element 12 is sized and/or configured to be activated only by such an event. For example, an SMA wire of predetermined size and activation temperature (e.g., 1 mm diameter and 110° C.) may interconnect the medium 18 and a driven braking component as further described below.

In FIG. 3, the SMA wire 12 is directly wrapped around first and second brake pads (e.g., outboard and inboard brake shoes) 28,30 driven by a piston 32. The wire 12 is configured to cause the pads 28,30 to engage by reducing the radius of the wrap, when activated. Preferably, the wire 12 is fixedly coupled to the outboard pad 28, for example, via eyelets 28a defined thereby. The floating or inboard pad 30 (more particularly, the support bracket, etc.) preferably defines fixed guides 30a that entrain the wire 12, so as to maintain alignment and retention during normal operation. It is appreciated that in many cases the lighting strike or similar event may also vaporize the element 12 after activation. As such, where necessary the preferred actuator 10 includes a holding mechanism 14 (e.g., a ratchet, detent, or latch) that engages when the system 100 is modified (e.g., the brake pads are caused to engage), so as to present a zero-power hold that retains the system, body, and/or circuit 100 in the modified configuration, when the change is reversed or removed. In FIG. 3, for example, the wire 12 is also drivenly coupled to a pin 20 that releases a spring-biased latch 14a, such that activation, further results in the release of the latch 14a and its subsequent engagement to at least one catch 14b defined by the piston 32. More preferably, where appropriate, a plurality of ratcheting catches 14b are defined, so as to provide incremental holds.

Figure 1:
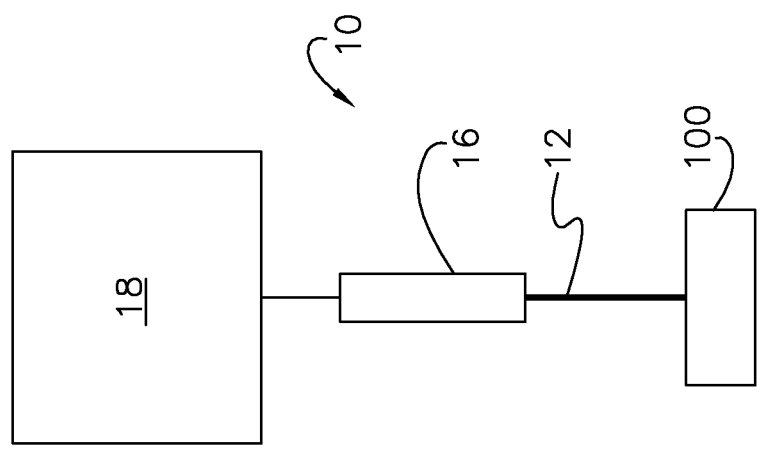
FIG. 1 is a schematic view of an active material actuator drivenly coupled to a body and configured to activate during a lightning strike or similar event, in accordance with a preferred embodiment of the invention.

In another embodiment, the actuator 10 is drivenly coupled to an electrically isolated piston 32 or hydraulic fluid reservoir 34 communicatively coupled, for example, to a brake caliper 36 (FIGS. 1 and 2). More particularly, an SMA wire 12 uses the piston base as a ground, and is connected in series to an MOV 16; and the MOV 16 is connected to the vehicle body 18, thereby establishing a current path to the SMA wire 12. The MOV 16 is configured so as to fail just prior to the failure of the insulation layer (not shown) of a conventional vehicle, as it is appreciated that when lightning strikes, the insulation layer creates a potential difference between the body 18 and the piston chamber/caliper 36. The insulation layer is preferably thick enough to sustain or absorb the 85 to 200 amps from the alternator without passing current but also be thin enough for lightning or a shorting battery to overcome it.

Thus, the MOV 16 in series with the SMA wire 12 creates a current path with the MOV 16 acting like a switch. In alternative embodiments, activating the wire 12 may be used to directly drive the piston 32 (i.e., body 100, as shown in FIG. 1), or open a valve 38 fluidly coupled to the pressurized reservoir 34 (FIG. 2). Similarly, it is appreciated that the active material element 12 may itself present a reconfigurable orifice that achieves an open condition, only when activated by an event. Alternatively, the wire 12 may be used to release a spring loaded actuator, such as shown in FIG. 3, to effect the movement of the piston 32.

In FIG. 5, the actuator 10 is used to open a circuit 100 during an event. In this configuration, the actuator 10 includes a barrier 16 interconnecting the stricken structure 18 and an SMA wire 12. The wire 12 is drivenly coupled to a conductive contact (e.g., slider, toggle switch, etc.) 40 operable to open/close the circuit 100. Again, when the structure 18 is struck by lightning or is exposed to a similar event, the barrier 16 is overcome, thereby allowing the shape memory wire 12 to be activated. When the wire 12 is caused to contract the contact 40 moves out of the circuit path, thereby opening the circuit 100. More preferably, a second barrier/electric insulator 42 is presented intermediate the wire 12 and contact 40 so as to prevent the transfer of current to the circuit 100 during activation.

In another aspect of the invention, and as shown in FIG. 6, it is appreciated that activation of an active material element 12 can be used to passively effect grounding of an otherwise non-grounded structure (e.g., a vehicle having large rubber tires) 18. In this configuration, an MOV 16 and SMA wire 12 combination may again be overcome and activated, for example, to pull a pin 20, so as to cause the release of a spring or loaded "javelin type" grounding system, wherein the grounding system ejects a conductive metal rod 44 to a position interconnecting the earth and the stricken structure (e.g., vehicle body) 18.

Finally, it is also appreciated that, in either of the aforementioned embodiments, the actuator 10 is preferably configured to disengage the system 100 (or otherwise return the driven member) after a predetermined period, so as to enable normal operation after the event; and to that end may include a Joule activated SMA latch release (not shown) that is selectively activated on-demand or autonomously once the main circuit 100 comes back on line.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Also, as used herein, the terms "first", "second", and the like do not denote any order or importance, but rather are used to distinguish one element from another, and the terms "the", "a", and "an" do not denote a limitation of quantity, but rather denote the presence of at least one of the referenced item. All ranges directed to the same quantity of a given component or measurement are inclusive of the endpoints and independently combinable.

What is claimed is:

1. An active material actuator passively activated during a sudden large voltage/current generation event, and communicatively coupled to a system, body or circuit presenting a first condition, said actuator comprising:
    a conductive medium; and
    at least one shape memory alloy wire element operable to undergo a reversible change in fundamental property when exposed to or occluded from an activation signal resulting only from a current or voltage potential generated by the event, so as to be activated or deactivated respectively, wherein the element is electrically connected to the medium, said element being drivenly coupled to and configured to modify the system, body, or circuit as a result of the change;
    wherein:
        the conductive medium includes a frame, chassis, or structural panel of a vehicle;
        the system, body, or circuit includes a by-wire system of a vehicle; and
        the electrical functionality of the by-wire system is maintained by the modification of the system, body, or circuit as a result of the change in the element.

2. The actuator as claimed in claim 1, further comprising a barrier interconnecting the element and medium, and configured to be overcome by the voltage/current event, so that the element is activated only during the event.

3. The actuator as claimed in claim 2, wherein the barrier is a Metal Oxide Varister.

4. The actuator as claimed in claim 1, wherein a plurality of elements are configured to vary the modification of the system, body, or circuit relative to an event characteristic.

5. The actuator as claimed in claim 1, wherein the change releases stored energy, and the system, body or circuit is modified as a result of releasing the energy.

6. The actuator as claimed in claim 1, wherein the change causes the system, body, or circuit to shift from a first and to a second condition, and the system further includes a locking mechanism operable to retain the system, body, or circuit in the second condition.

7. The actuator as claimed in claim 1, wherein the by-wire system of the vehicle is a steer-by-wire system.

8. An active material actuator passively activated during a sudden large voltage/current generation event, and communicatively coupled to a system, body or circuit presenting a first condition, said actuator comprising:
    a conductive medium; and
    at least one active material element operable to undergo a reversible change in fundamental property when exposed to or occluded from an activation signal resulting only from a current or voltage potential generated by the event, so as to be activated or deactivated respectively, wherein the element is electrically connected to the medium, said element being drivenly coupled to and configured to modify the system, body, or circuit as a result of the change;
    wherein the system includes first and second selectively engageable brake pads, and the element presents a wire wrap configured to cause the pads to selectively engage, as a result of the change.

9. The actuator as claimed in claim 8, wherein the pads are configured to entrain the wire, so as to maintain proper alignment during normal operation.

10. An active material actuator passively activated during a sudden large voltage/current generation event, and communicatively coupled to a system, body or circuit presenting a first condition, said actuator comprising:
    a conductive medium; and
    at least one active material element operable to undergo a reversible change in fundamental property when exposed to or occluded from an activation signal resulting only from a current or voltage potential generated by the event, so as to be activated or deactivated respectively, wherein the element is electrically connected to the medium, said element being drivenly coupled to and configured to modify the system, body, or circuit as a result of the change;

wherein the system is fluidly coupled to a pressurized fluid reservoir through an orifice, and the change causes the orifice to achieve an open condition.

11. The actuator as claimed in claim 10, wherein:
the orifice is defined by an accumulator valve;
the element is a shape memory alloy (SMA) wire; and
the SMA wire is drivenly coupled to the valve.

12. An active material actuator passively activated during a sudden large voltage/current generation event, and communicatively coupled to a system, body or circuit presenting a first condition, said actuator comprising:
a conductive medium; and
at least one active material element operable to undergo a reversible change in fundamental property when exposed to or occluded from an activation signal resulting only from a current or voltage potential generated by the event, so as to be activated or deactivated respectively, wherein the element is electrically connected to the medium, said element being drivenly coupled to and configured to modify the system, body, or circuit as a result of the change;
wherein:
the change causes the system, body, or circuit to shift from a first and to a second condition, and the system further includes a locking mechanism operable to retain the system, body, or circuit in the second condition; and
the locking mechanism presents a ratchet communicatively coupled to and operable to retain the system, body, or circuit in one of a plurality of second conditions, when the change is reversed.

13. An active material actuator passively activated during a sudden large voltage/current generation event, and communicatively coupled to a system, body or circuit presenting a first condition, said actuator comprising:
a conductive medium; and
at least one active material element operable to undergo a reversible change in fundamental property when exposed to or occluded from an activation signal resulting only from a current or voltage potential generated by the event, so as to be activated or deactivated respectively, wherein the element is electrically connected to the medium, said element being drivenly coupled to and configured to modify the system, body, or circuit as a result of the change;
wherein the system, body, or circuit is communicatively coupled to an electrically isolated secondary power source composing a secondary circuit, and the change closes the secondary circuit, so as to communicatively couple the secondary source and system, body, or circuit.

14. The actuator as claimed in claim 13, wherein the secondary power source is an ultra-capacitor.

15. An active material actuator passively activated during a sudden large voltage/current generation event, and communicatively coupled to a system, body or circuit presenting a first condition, said actuator comprising:
a conductive medium; and
at least one active material element operable to undergo a reversible change in fundamental property when exposed to or occluded from an activation signal resulting only from a current or voltage potential generated by the event, so as to be activated or deactivated respectively, wherein the element is electrically connected to the medium, said element being drivenly coupled to and configured to modify the system, body, or circuit as a result of the change;
wherein the element is configured to selectively interconnect the body to ground, so as to further ground the body, as a result of the change.

16. The actuator as claimed in claim 15, wherein the change causes a spring-biased conductive rod to be ejected and achieve a second condition where the rod interconnects the body and earth.

17. An active material actuator passively activated during a sudden large voltage/current generation event, and communicatively coupled to a system, body or circuit presenting a first condition, said actuator comprising:
a conductive medium; and
at least one active material element operable to undergo a reversible change in fundamental property when exposed to or occluded from an activation signal resulting only from a current or voltage potential generated by the event, so as to be activated or deactivated respectively, wherein the element is electrically connected to the medium, said element being drivenly coupled to and configured to modify the system, body, or circuit as a result of the change;
wherein:
the change is configured to open a circuit, so as to protect the circuit during the event; and
the circuit includes a conductive slider, and an electric insulator is disposed intermediate the slider and element.

* * * * *